United States Patent [19]

Kuo

[11] Patent Number: 4,854,008
[45] Date of Patent: Aug. 8, 1989

[54] DETACHABLE CASTOR SUPPORT FOR A BABY CARRIAGE

[76] Inventor: Jason Kuo, No. 15, Lane 37, Fu Hsing Street,, I Chia Tsun, Jen Te Hsiang, Tainan Hsien, Taiwan

[21] Appl. No.: 279,076

[22] Filed: Dec. 2, 1988

[51] Int. Cl.⁴ ............................................. B60B 33/00
[52] U.S. Cl. .......................................... 16/30; 16/39; 16/44
[58] Field of Search ...................... 16/30, 31 A, 38, 39, 16/44; 280/11.23, 11.26, 11.27, 11.28

[56] References Cited

U.S. PATENT DOCUMENTS

| | | | |
|---|---|---|---|
| 3,337,230 | 8/1967 | Golding | 16/44 X |
| 4,146,241 | 3/1979 | Stevenson | 280/11.27 |
| 4,731,899 | 3/1988 | Huang | 16/44 X |

Primary Examiner—Fred A. Silverberg
Attorney, Agent, or Firm—Morton J. Rosenberg

[57] ABSTRACT

This invention relates to a detachable castor support for a baby carriage and in particular to one including a body portion having a vertical shaft with a pivot hole and a protuberance, a stand having a rectangular recess having two sides each formed with a semicircular hole at the lower part thereof and an elongated slot at the front part thereof, a U-shaped member extending from the rear part of the stand and having a hole in each vertically extending sidewall of the U-shaped member and a semicircular notch at the bottom thereof, a connector disposed within the stand with its tubular lug engaged with the semicircular notch of the stand and its protuberance fitted into the elongated slot of the stand and a rivet extending through the hole of the U-shaped member and the lower part of the vertical shaft of the body portion whereby the baby carriage can be stowed conveniently and the castor thereof can be easily replaced with a new one once damaged.

1 Claim, 3 Drawing Sheets

DETACHABLE CASTOR SUPPORT FOR A BABY CARRIAGE

BACKGROUND OF THE INVENTION

Although various collapsible baby carriages have been previously manufactured to enable them to be conveniently carried and to occupy a small storage space, it has been found that the castor thereof is easily damaged and cannot be replaced thus causing problems to the user. Further, since the castor cannot be detached from the baby carriage, it will still occupy a rather large storage space.

It is, therefore, an object of the present invention to provide a detachable castor support for a baby carriege which may obviate and mitigate the abovementioned drawbacks.

SUMMARY OF THE INVENTION

This invention relates to a detachable castor support for a baby carriage.

It is the primary object of the present invention to provide a detachable castor support which is easily connected to and detached from the baby carriage thereby enabling the castor to be replaced once damaged.

It is an other object of the present invention to provide a detachable castor support which can facilitate the stowage of a baby carriage.

It is still another object of the present invention to provide a detachable castor support which enables the baby carriage to be carried conveniently.

It is a further object of the present invention to provide a detachable castor support which is simple in construction.

It is still a further object of the present invention to provide a detachable castor support which is economic to produce.

Other objects and merits and a fuller understanding of the present invention will be obtained by those having ordinary skill in the art when the following detailed description is read in conjunction with the accompanying drawings wherein like numerals refer to like or similar parts.

DETAILED DESCRIPTION OF THE PREFERRED EMBODIMENT

Figure 1:
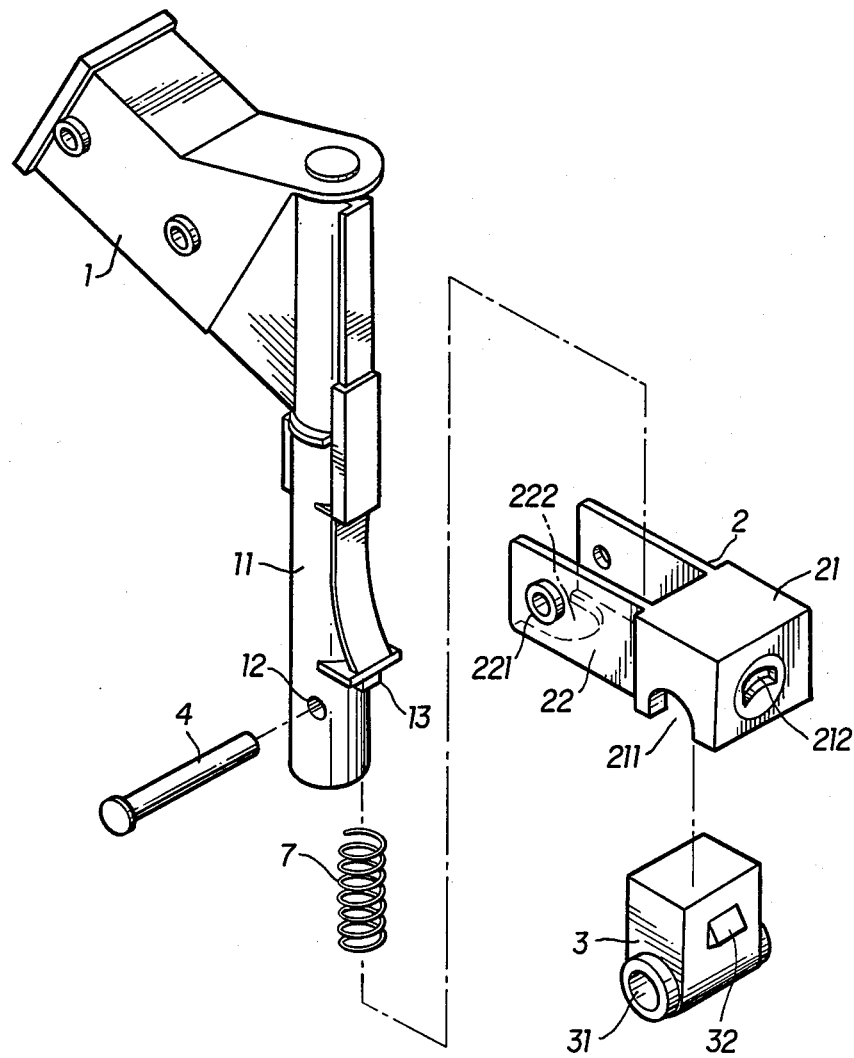
FIG. 1 is an exploded view of the present invention.

For purposes of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the detachable castor support for baby carriages according to the present invention mainly comprises a boby portion 1, a stand 2 and a connector 3. The body portion 1 has a vertical shaft 11 with a pivot hole 12 and a protuberance 13. The stand 2 has a rectangular recessed element 21 having two sides each formed with a semicircular hole 221 at the lower part and an elongated slot 212 at the front part. A U-shaped member 22 extends from and is formed in one piece with the rear part of the stand 2 and has a hole 221 at each prong and a semicircular notch 222 at the bottom. The connector 3 has a tubular lug 31 at both sides and a protuberance 32 at the front side.

Figure 2:
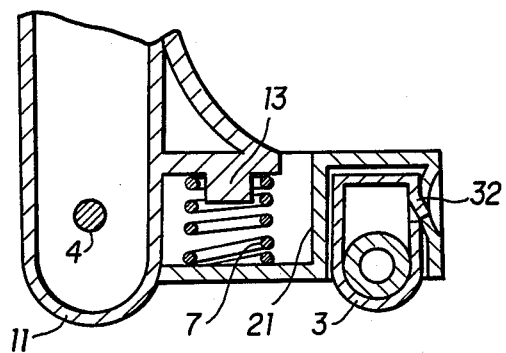
FIG. 2 is a sectional fragmentary view of the present invention.
Figure 3:
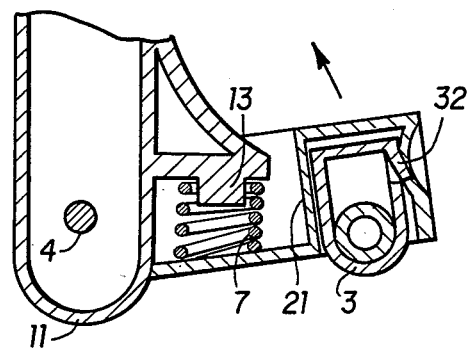
FIG. 3 is a sectional fragmentary view showing the principle of the present invention.
Figure 4:
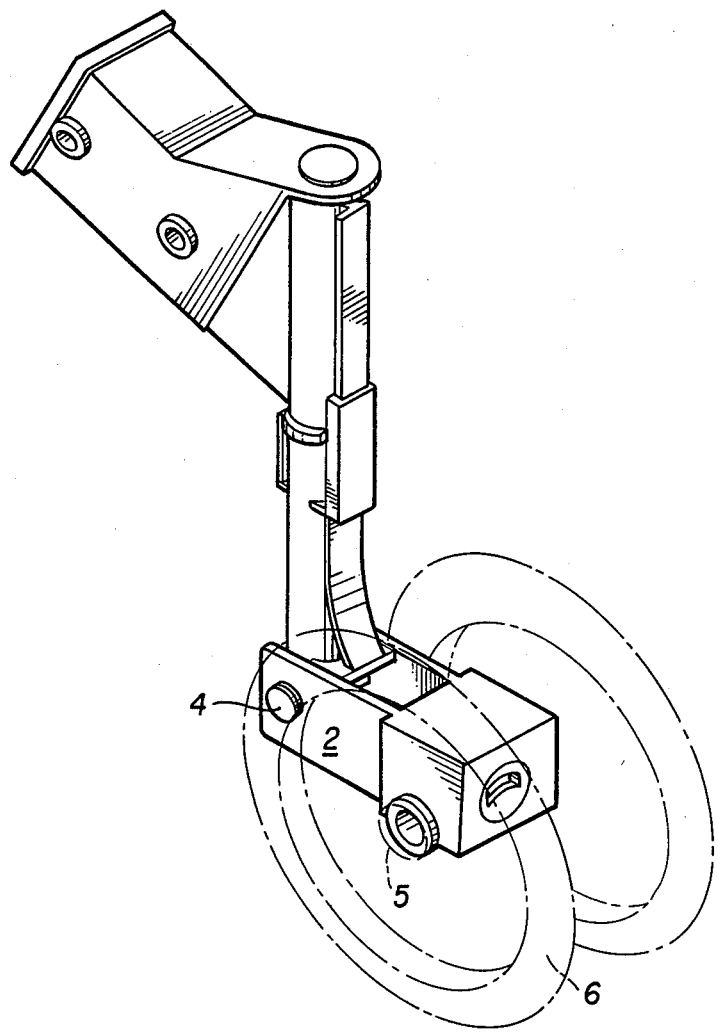
FIG. 4 is a working view of the present invention.

In assembly, the vertical shaft 11 is received in the semicircular notch 222 of the stand 2 and fixed in position by a rivet 4 extending through the holes 221 of the stand 2 and the pivot hole 12 of the vertical shaft 11. The connector 3 is disposed within the recess 21 of the stand 2, with the tubular lug 31 of the connector 3 engaged with the semicircular notch 211 of the stand 2 and the protuberance 32 of the connector 3 fitted into the elongated slot 212 of the stand 2. Hence, the connector is fixedly connected with the stand 2 to form a whole member. The connector 3 can be easily detached from the stand 2 by withdrawing the protuberance 32 from the elongated slot 212. A castor 6 is to be mounted on the connector 3 by means of an axle means 5 extending through the castor 6 and the tubular lugs 31 of the connector 3 (see FIG. 4), thereby connecting the connector 3, the castor 6 and the stand 2 together. Then, a spring 7 is disposed within the U-shaped member 22 with one end bearing against the protuberance 13 of the vertical shaft 11 and the other end against the inner bottom side of the U-shaped member 22 so as to lessen the shocking force (see FIGS. 2 and 3).

The body portion 1 is actually a part of a baby carriage and the stand 2 is fixedly mounted on the body portion 1 by the rivet 4. However, it should be noted that the connector 3 can be detached from the stand 2. That is, the castor 6 can be replaced with a new one once damaged.

Although this invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A detachable castor support for a baby carriage comprising:
   a body portion having a vertical shaft with a pivot hole and a first protuberance at a lower end thereof;
   a stand having a rectangular recess having two sides each formed with a semicircular notch at a lower part thereof and an elongated slot at a front part thereof;
   a U-shaped member including a horizontal bottom wall and two vertically extending sidewalls and extending from and being formed as one piece with a rear part of said stand and having a hole in each said U-shaped member sidewall and a semicircular notch in the bottom thereof, said bottom semicircular notch receiving a lower end of the vertical shaft of said body portion;
   a separate, removably attached connector, having a tubular lug at both sides and a second protuberance at the front side, fixedly disposed within said stand recess with the tubular lugs engaged within the semicircular notch as of said stand and the second protuberance fitted into the elongated slot of said stand; and a rivet extending through the hole of said U-shaped member and the pivot hole in the lower end of the vertical shaft of said body portion, an axle means having wheels thereon extending through the lugs in the connector, and a spring being located between the first protuberance and the bottom of the U-shaped member.

* * * * *